United States Patent [19]

Mueller et al.

[11] 4,024,395
[45] May 17, 1977

[54] SAMPLE CHANGER HAVING MODULAR TRACK ASSEMBLY

[75] Inventors: Anthony A. Mueller, Florence, Ky.; Frank W. Bao, Clermont, Fla.; Stephen D. Parker, Erlanger; James L. Hummeldorf, Morningview, both of Ky.

[73] Assignee: Actus, Inc., Florence, Ky.

[22] Filed: Mar. 23, 1976

[21] Appl. No.: 669,593

[52] U.S. Cl. .............................. 250/328; 198/723; 250/336
[51] Int. Cl.² ......................................... G01T 1/00
[58] Field of Search ................. 198/723, 722, 840; 250/328, 336, 338

[56] References Cited

UNITED STATES PATENTS

| 1,696,360 | 12/1928 | Peyser | 198/723 |
| 2,284,286 | 5/1942 | Krueger | 198/723 |
| 3,141,977 | 7/1964 | Fratantuno | 250/328 |
| 3,604,935 | 9/1971 | Nather | 250/328 |

*Primary Examiner*—Harold A. Dixon

*Attorney, Agent, or Firm*—Fleit & Jacobson

[57] ABSTRACT

Disclosed is an automatic sample changer for sequentially operating on a plurality of samples housed in test tubes, circulated around a continuous track, and sequentially associated with a radiation counting device by way of an elevator mechanism. The continuous track is in modular form, and is designed, respectively, to accommodate fifty, one hundred, two hundred or three hundred samples. Rotating index wheels are employed to drive the samples around the track, with several index wheels being used for the longer tracks. The motors controlling the respective index wheels are reversible, and when more than one motor is employed, the motors may be operated in parallel.

Also disclosed is a mechanism for loosely coupling the index wheels to their associated motors to facilitate repair and ensure accurate alignment with the plane of the continuous track. The inventive sample changer is also equipped with an electronic index display which may operate independently of the sample changer power supply, and a mechanism for indicting a low paper level in the print-out roll.

13 Claims, 10 Drawing Figures

SAMPLE CHANGER HAVING MODULAR TRACK ASSEMBLY

BACKGROUND OF THE INVENTION

This application relates generally to the field of radioimmunoassay, and in particular to an automatic sample changer for carrying and testing a plurality of gamma ray emitting samples. The sample changer disclosed in the present application is an extension of that which is described in U.S. Pat. application Ser. No. 504,743, filed on Sept. 10, 1974, now abandoned, and copending continuation U.S. Pat. application Ser. No. 626,923, filed on Oct. 29, 1975, each having been assigned to the present assignee. The attention of the reader is directed to this copending patent application, the disclosure of which is incorporated herein.

In the above-noted copending patent application, there is disclosed an automatic sample changer which is capable of sequentially testing up to 100 samples. The samples are moved along a continuous track by a single indexing wheel, and are successively associated with an elevator mechanism which transports the respective samples from the plane of the track into the testing zone. This known sample changer is equipped with a mechanical mechanism for indicating the sample being tested, and a printing mechanism for permanently recording data generated during each test. Also provided in this known sample changer is a mechanism for indicating when the paper on the print-out roll becomes low.

It is the purpose of the present invention to expand the capabilities and to improve the performance of the automatic sample changer disclosed in U.S. Pat. application Ser. No. 626,923.

SUMMARY OF THE INVENTION

The present invention relates to an automatic sample changer having a continuous track along the upper surface thereof, with the track being in modular form. In this manner, the base of the sample changer, with the associated electronic control and sensing apparatus, may be associated with tracks of varying size. It is contemplated that tracks of 50, 100, 200 and 300 sample capabilities be designed for association with the base of the sample changer forming a part of the present invention. For the larger capacity tracks, it is contemplated by the present invention that a plurality of index wheels and associated motors be provided to move the samples along the track. To provide control and flexibility, the respective motors may be operated in parallel, and are reversible. In this manner, when an indexing operation is initiated, the respective samples are smoothly moved along the track. Or, if it is desired to return a sample already tested to the elevator mechanism, it is possible to do so by reversing the indexing motors, thereby avoiding the necessity for either cycling all of the samples entirely around the track or changing the relative track positions of several samples.

The index wheels of the present invention are loosely coupled to the shafts of removable motors, and are maintained parallel to the plane of the track by means of biasing springs acting between the respective index wheels and their motors. Pads, such as of Teflon, are mounted on the bottom of the track surface and on the top of the index wheel surfaces to provide smooth, low-friction bearing surfaces. The loose coupling between each index wheel and its motor also facilitates repairs.

The inventive sample changer is also provided with a compact and efficient electronic position indicator mechanism employing light-emitting diodes (LED). To ensure that the position indicator maintains proper count in the event that power fails or the unit is disconnected from its source of electrical power, the indicator mechanism includes a battery operated circuit which maintains the LED display in its active state.

Further, as in the sample changer disclosed in the above-noted copending application, the inventive sample changer is provided with a paper tape mechanism wherein the position of the samples on the track and the data developed during a measuring operation, are permanently recorded. For times when paper is low on the roll, the inventive sample changer is provided with a unique and accurate mechanism for sensing paper level. The inventive mechanism operates at the surface of the paper, rather than at the edge, and is therefore insensitive to the usual irregularities in the edge of paper rolls.

It is accordingly one object of the present invention to provide an automatic sample changer which transports samples to be tested on a modulator track assembly.

A related object of the present invention is to provide an automatic sample changer which may be readily adapted to handle tracks of various lengths.

A more specific object of the present invention is to provide an automatic sample changer which includes a modular track assembly capable of handling 50, 100, 200 or 300 samples.

A further object of the present invention is to provide an automatic sample changer wherein the movement of samples along a continuous track is controlled by means of reversible motors.

Another object of the present invention is to provide an automatic sample changer wherein the samples are moved along a continuous track through the means of at least one index wheel which is loosely coupled to its associated drive motor.

Yet another object of the present invention is to provide an automatic sample changer wherein samples are moved along a continuous track through the means of at least one index wheel which is maintained in planar alignment with the track through the means of a biasing mechanism.

A further object of the present invention is to provide an automatic sample changer wherein samples are moved along a continuous track by means of at least one index wheel loosely coupled to respective drive motors to facilitate detachment and repair of the drive motors.

Yet another object of the present invention is to provide an automatic sample changer wherein samples are moved along a continuous track, and wherein the sample changer is provided with an electronic indicator for displaying an identification of the sample under test.

A related object of the present invention is to provide an automatic sample changer having an electronic sample position indicator which remains operative despite sample changer loss of power or disconnection from its power source.

A more specific object of the present invention is to provide an automatic sample changer with an electronic sample position indicator utilizing light-emitting diodes, which are powered either by the AC sample changer power source or by an independent DC power supply circuit.

Still another object of the present invention is to provide an automatic sample changer having a paper print-out capability, and including a mechanism for indicating when the paper on the roll is low.

A more specific object of the present invention is to provide a sample changer having a paper level indicator which is insensitive to surface irregularities on the sides of paper rolls.

These and other objects of the present invention, as well as many of the attendant advantages thereof, will become more readily apparent when reference is made to the following description, taken in conjunction with the accompanying drawings.

DETAILED DESCRIPTION OF THE DRAWINGS

Figure 1:
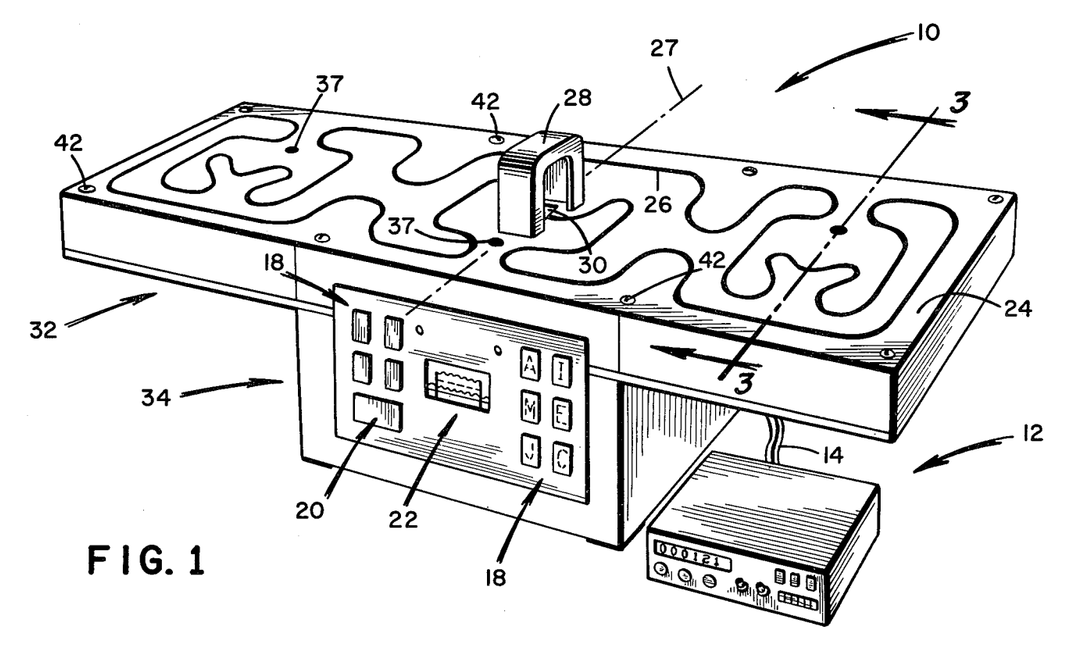
FIG. 1 is a perspective view of the automatic sample changer forming a part of the present invention, capable of handlind 300 samples.

With reference first to FIG. 1, the inventive automatic sample changer can be seen generally at 10. The sample changer 10 is connected to a display and computation unit 12 by way of three linking cables shown generally at 14. The front panel 16 of the sample changer 10 is equipped with several control and indicator buttons 18, the functions of which are generally described in detail in copending U.S. patent application Ser. No. 626,923. An electronic conveyor position indicator 20 and a paper tape print-out 22 can also be seen on the front panel 16. A cover plate 24 is located at the upper surface of the sample changer 10, and has carved therein a continuous track 26. The track 26 is symmetrical about center line 27. An elevator cover plate 28 covers and protects an elevator mechanism (not shown), wherein samples are lowered into the interior of the sample changer 10 through an opening 30 in the cover plate 24. The elevator mechanism is fully described in the above-noted copending application.

As illustrated in FIG. 1, the track 26 of the sample changer 10 is capable of handling 300 samples, and is adapted to sequentially associate these samples with the elevator mechanism for transport through opening 30. This embodiment of the sample changer 10 comprises a 300-sample modular track unit 32 and a base 34. The base 34 contains the radiation sensor and the electronic circuitry utilized in the sample changer and described in the copending application. The modular track unit 32, on the other hand, carries the cover plate 24, a plurality of pucks 25 (FIG. 4), three index wheels 36 mounted for moving the pucks 25 along the track 26, and three motors 38 (FIG. 3) for operating the respective index wheels 36.

Figure 2:
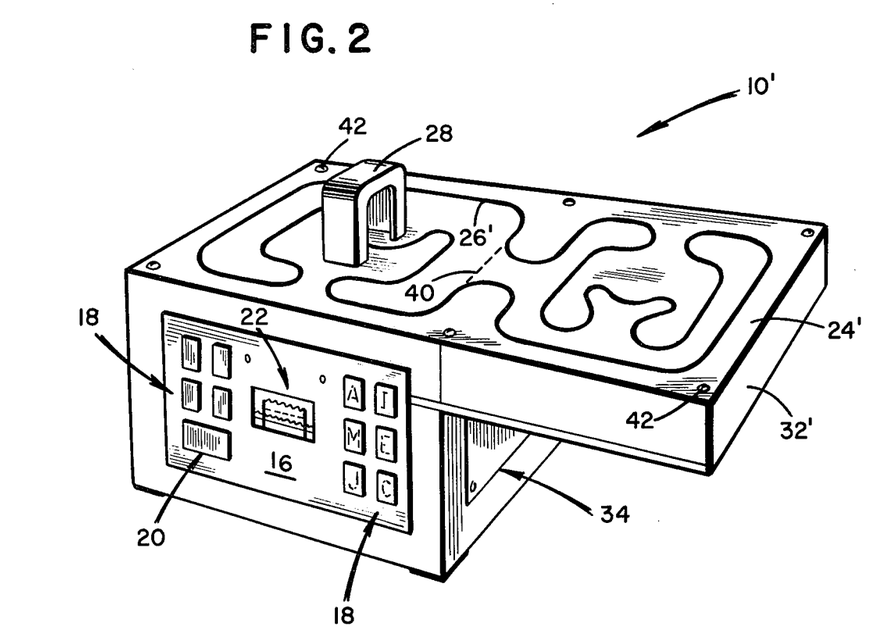
FIG. 2 is a perspective view similar to FIG. 1, but illustrating the inventive sample changer equipped with a 200 sample track module.

As will be described in greater detail in the following paragraphs, the modular track unit 32 is capable of being removed from the base 34. In this regard, it should be noted that the electronics housed in the base 34 control the operation of the motors 38, and are connected thereto through the means of conventional plug-in connectors (not shown). Accordingly, the modular track unit 32' may quickly and easily be removed from the associated base 34, so that a given base may be readily adapted to associate with a 300-sample track unit 32 such as that shown in FIG. 1 or, for example, a 200-sample track unit 32 such as that illustrated in FIG. 2. Furthermore, it is contemplated that the base 34 also be capable of receiving a 100-sample track unit with the track 26 continuous as shown at 40 in FIG. 2, and as has already been described in copending U.S. patent application Ser. No. 626,923.

Figure 3:
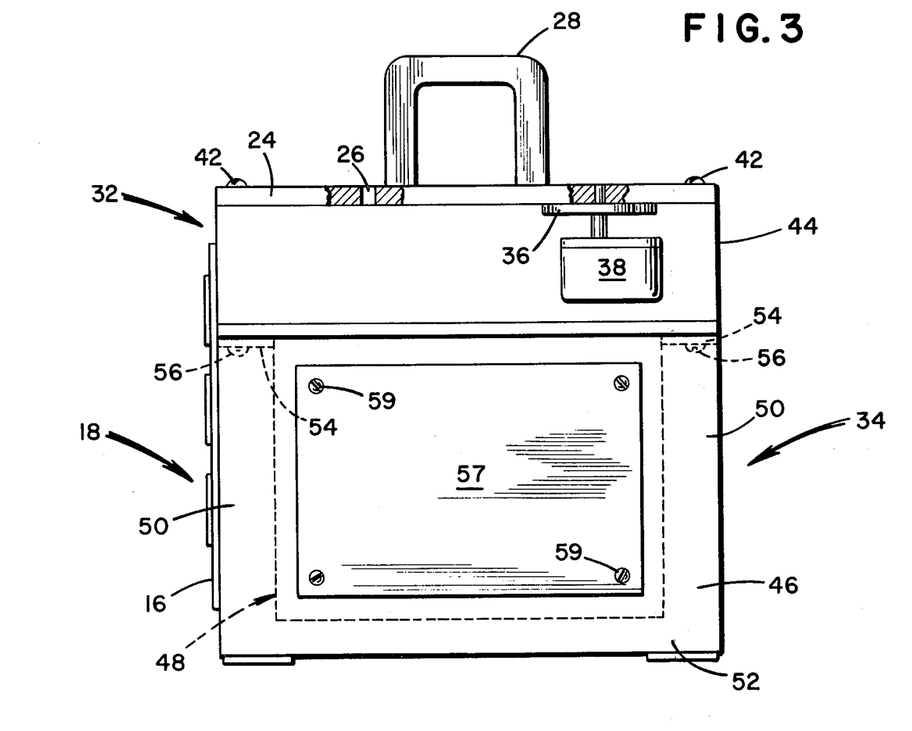
FIG. 3 is a cross section of the inventive sample changer, taken along line 3—3 of FIG. 1.

With further reference to FIGS. 1 and 3, the modular construction of the track unit 32 will be described in greater detail. As noted previously, the cover plate 24 is integral with the modular track unit 32. Plate 24 is attached by bolts 42 to a case 44 of the track unit 32. In a similar manner, the case 44 of the track unit 32 is mounted on a case 46 of the base 34. In this regard, the case 46 houses an internal spider 48 which has vertical arms 50 at each corner of the case 46 extending upwardly from a lower frame 52. At the upper region of each arm 50 is a horizontal flange 54. Bolts 56 extend through flange 54 and associate with the bottom of case 44 to hold case 44 firmly onto the spider 48.

The spider 48 is, in turn, fixed to the case 46 to complete the rigid assembly. A cover plate 57 is held by bolts 59 onto the side of case 46, to permit access to interior bolts 56.

Figure 4:
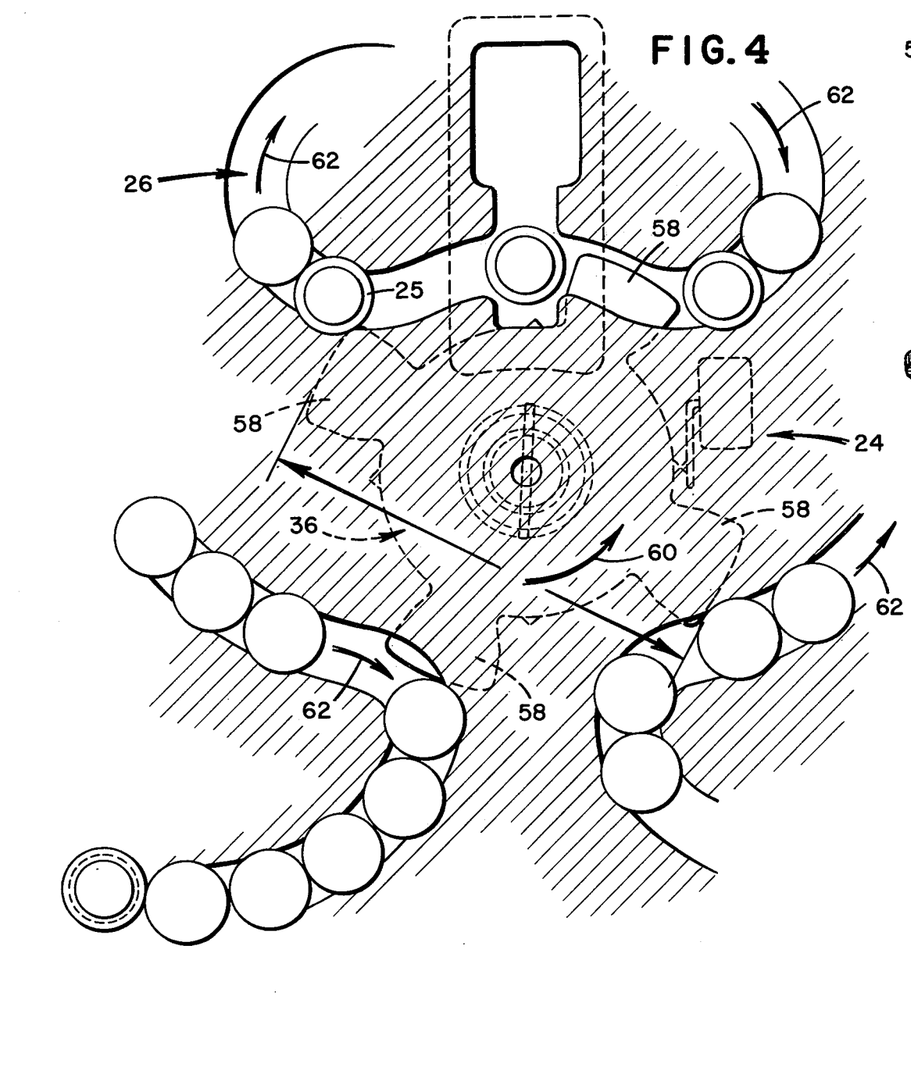
FIG. 4 is a plan view of a track segment of the inventive sample changer.

With reference now to FIGS. 3 through 6, the manner in which the pucks 25 are moved about the track 26 will be described. As best seen in FIG. 4, the index wheel 36 comprises four fingers 58 which extend respectively into given regions of the track 26. As fully explained in copending U.S. patent application Ser. No. 626,923, rotation of the index wheel 36 in the direction of arrow 60 moves the respective pucks 25 in the direction of arrows 62.

Figure 5:
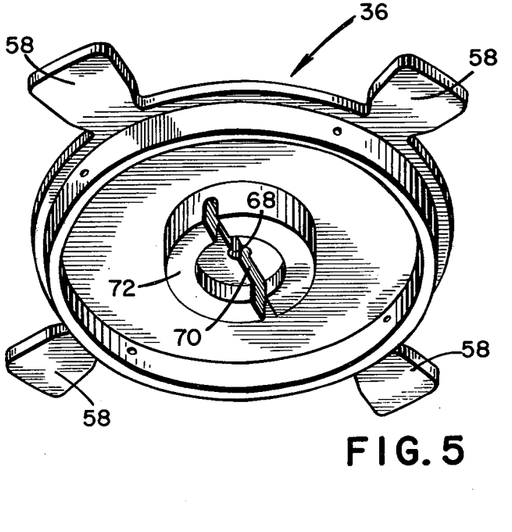
FIG. 5 is a perspective view of the bottom of an index wheel.
Figure 6:
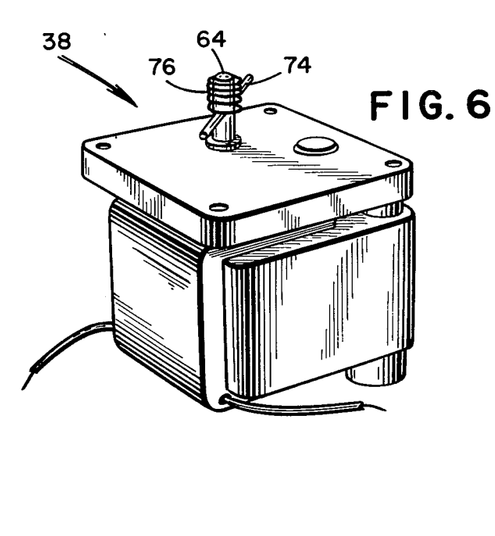
FIG. 6 is a perspective view of an index wheel motor, shaft and wheel biasing mechanism.

As noted above, the index wheel 36 associates with its motor 38 in such a manner that the wheel 36 is maintained in planar alignment with the cover plate 24 so as to move the pucks 25 without stress. This is accomplished in the following manner, with reference being made to a single motor. The motor 38 is fixed to the interior surface of the case 44. The shaft 64 of motor 38 extends from the body of motor 38 and into a bore 66 through the cover plate 24 (defining sites 37). The index wheel 36 fits over the shaft 64 of the motor 38 through the means of a bore 68 having an internal diameter slightly larger than the external diameter of the motor shaft 64. As best seen in FIG. 5, the index wheel 36 is equipped with a slot 70 through a shoulder 72 at the bottom of the index wheel 36. Slot 70 extends through the center of the bore 68. As seen in FIG. 6, the shaft 64 of motor 38 is provided with a pin 74 and a spring 76. Then, once assembled as illustrated in FIG. 3, with the motor shaft 64 residing in bore 68 of index wheel 36, the spring 76 urges the index wheel 36 toward and into planar alignment with the cover plate 24. And, when the motor 38 and index wheel 36 are in association, the pin 74 through motor shaft 64 sits in slot 70 on index wheel 36. In this manner, when the shaft 64 of motor 38 rotates, so too does the index wheel 36, through the means of pin 74 and slot 70. At the same time, relative movement between the motor shaft 64 and index wheel 36 is permitted without affecting the coplanar orientation between the index wheel 36 and the cover plate 26. Pads 78 and 80, as of Teflon, are mounted, respectively, on the bottom of cover plate 24 and on the top of index wheel 36. Pads 78 and 80 define a low-friction bearing surface between the cover plate 24 and index wheel 36.

Figure 7:
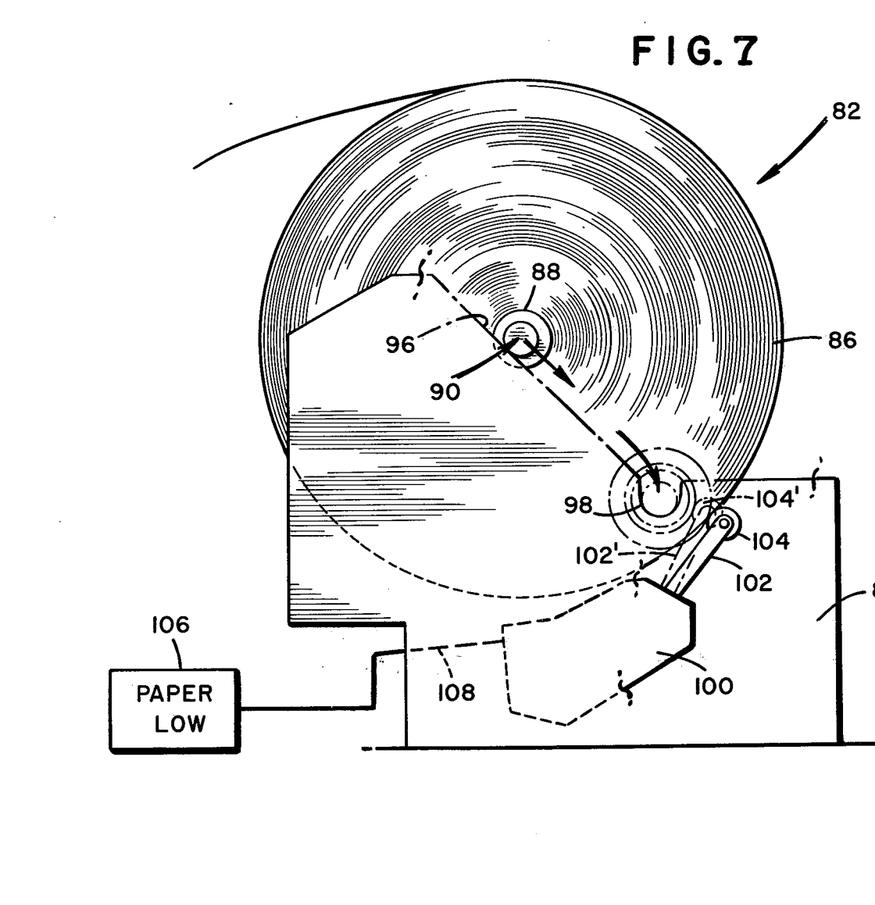
FIG. 7 is a side elevation of the inventive paper level indicator.
Figure 8:
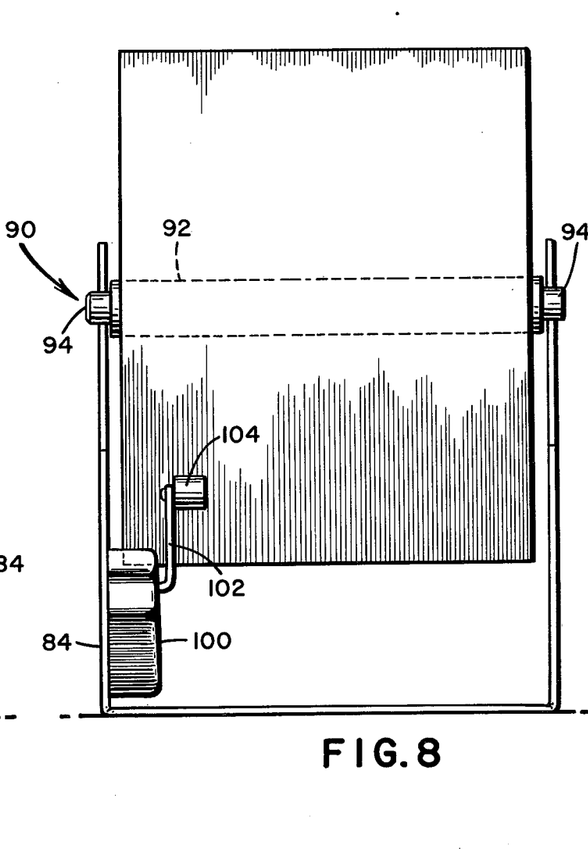
FIG. 8 is a rear elevation of the paper level indicator illustrated in FIG. 7.

With reference now to FIGS. 7 and 8, the inventive paper level indicator will be described. The indicator is shown generally at 82, and includes a generally U-shape frame 84. A paper roll 86 with its customary cardboard tube 88, is positioned on a shaft 90 forming a part of the indicator 82. As seen best in FIG. 8, the shaft 90 comprises a central region 92 having an outside diameter substantially the same as the inside diameter of cardboard tube 88, and reduced diameter end portions 94. The paper roll 86 is mounted on the frame 84 by contact between the upper wall of the frame and the reduced diameter portion 94 of the shaft 90.

Each of the upstanding walls of the U-shape frame 84 comprises a downwardly sloped region 96, the bottom of which terminates in a detent 98. The detent 98 generally corresponds in shape to the reduced diameter portion 94 of the shaft 90. A microswitch 100 is secured to one upstanding arm of the frame 84, and has an arm 102 extending therefrom. A roller 104 is mounted at the end of the arm 102 remote from the body of the microswitch 100. As illustrated in FIG. 7, the microswitch 100 associates with a "paper low" indicator 106, through the means of electrical leads 108.

The operation of the indicator 82 is as follows. When the paper roll 86 is fresh, it is cradled as shown in FIG. 7, between the upstanding arms of the frame 84. The reduced diameter portion 94 of the shaft 90 is held on the downwardly sloped regions 96 of the frame 84. The paper roll 86 is urged, by gravity and through the means of shaft 90 and sloped regions 96, toward the detent 98. With a substantial amount of paper on the roll, the arm 102 of microswitch 100 is in its depressed, or downward position, prevents the paper roll 86 from rolling down regions 96, and maintains the "paper low" indicator inactive. As the diameter of the paper roll 86 decreases, the shaft 90 rolls downwardly toward the detent 98, and finally into detent 98. During this entire motion, the arm 102 of the microswitch 100 is held in its downward position wherein the indicator 106 is maintained inactive. However, once the level of the paper reaches a predetermined low level, the roller 104 takes the position indicated at 104', and the arm 102 takes a corresponding position as shown at 102'. In this position, the microswitch 100 changes state, and actuates the "paper low" indicator 106 to illuminate the same. The "paper low" indicator 106 is on the front face 16 of the base 34, as shown in FIG. 1, so that the operator is given a visual indication when the paper level is low.

Figure 9:
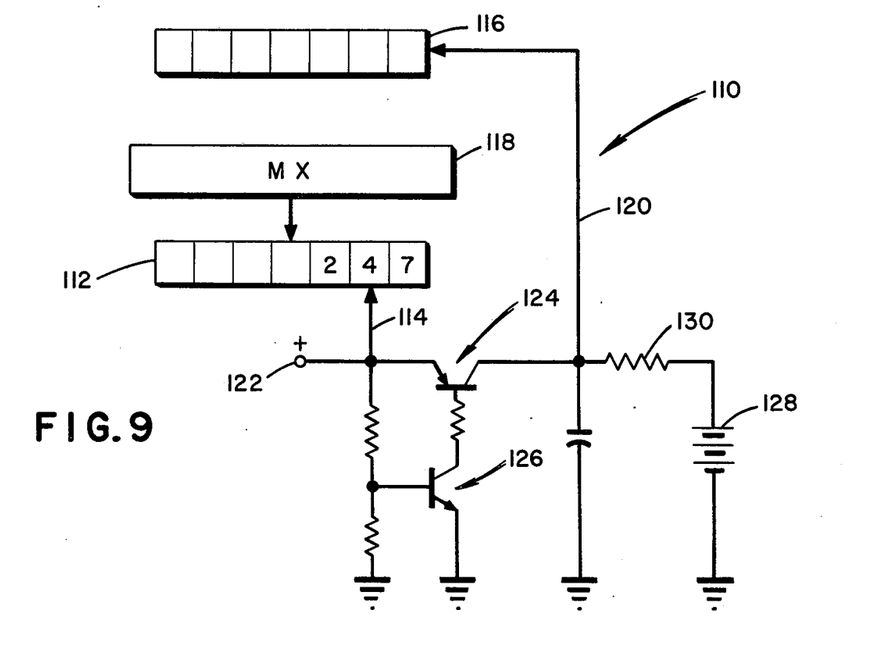
FIG. 9 is a combined circuit and block diagram of the inventive electronic position indicator.

Turning now to FIG. 9, the inventive electronic position indicator will be described. The position indicator is shown generally at 110, and includes a seven-digit LED display 112 powered on line 114. A seven-digit C/MOS counter 116 associates with circuitry (not shown) for receiving information indicating a direct count of the particular sample under test. The count input to the counter 116 is held in the counter and, at the same time, is transmitted to a multiplexer unit 118. The multiplexer 118 associates directly with the LED display 112, and serves as an input resulting in a visual display of the information being stored in the counter 116.

Power to the counter 116 is provided at terminal 120. Under normal operating conditions, when the sample changer is operative, a positive voltage of slightly less than 5-volts appears at terminal 120. A positive 5-volt signal from the sample changer is applied at terminal 122, and this biasing voltage places a PNP transistor 124 and an NPN transistor 126 in respective conductive states. The 5-volt bias appearing at a terminal 122 is conducted through transistor 124 and reaches terminal 120 to provide a power input to the counter 116. This same voltage serves to charge a three-cell nickel cadmium battery 128 through a series resistor 130. Power is directed to display 112 at line 114.

Should the sample changer be disconnected from its power source, then transistors 124 and 126 would revert to their respective non-conductive states. Under this condition, terminal 120 would take a voltage generated by battery 128. Power therefore is maintained in the counter 116, and the counter thereby holds the position indication in its memory. Power to display 112 is in this condition interrupted, and hence there is no visual display. However, once power is resumed, display 112 would immediately show the information stored by counter 116. Transistors 124 and 126 would again begin to conduct, and battery 128 would take its charging state.

Finally, with reference to FIG. 10, the circuit diagram for operating and braking the index wheel motors will be described. A motor run control 132 is commanded by various controls associated with the sample changer, and previously described in the above-noted copending application. Accordingly, these command sources are not shown, and will not be described in detail. Suffice it to say that the motor run control, when so commanded, provides current for two triac circuits. In this regard, triaces 134 and 136 are illustrated, with respective gates 138 and 140 associating with the motor run control 132. Gating signals for the triac 134 are received directly from the motor run control 132, but triac 136 receives gating current from the motor run control 132 through a 0.5 second turn-off delay circuit 142. A reversing switch 144 is located in the circuit of triac 134, and serves to reverse the polarity of the power fed to the shading windings of the respective index motors. Triac 136, on the other hand, associates with the field windings of the respective index motors, and provides power of a fixed polarity.

Figure 10:
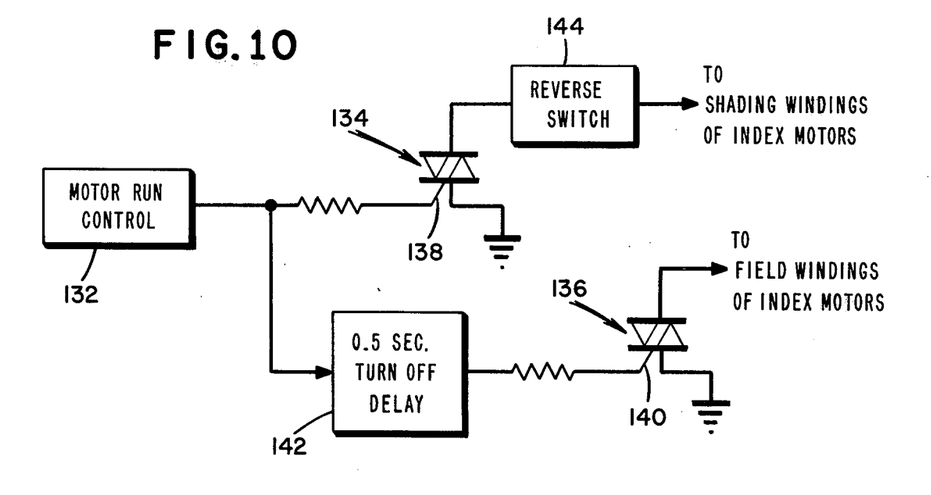
FIG. 10 is a combined circuit and block diagram of the control mechanism for operating and braking the index wheel motors.

The operation of the power and braking circuit of FIG. 10 is as follows. With the motor run control 132 delivering gating current to the respective triacs 134 and 136, and with the reversing switch 144 in a first of its two states, power to both the shading and field windings of the respective index motors is, for example, in phase. This in phase relationship defines one operating condition, such as clockwise operation of all index motors. With the reversing switch 144 in its other state, however, the phase of the power fed to the shading windings is shifted by 180°, so that the power to the shading and field windings is out of phase. Under this condition, motor operation would, for example, be counterclockwise.

Braking of the index motors is accomplished by removing gating current from the respective triacs 134 and 136, through the means of motor run control 132. Power is immediately interrupted from the gate 138 of triac 134, and therefore no power reaches the shading windings of the respective index motors. The turn-off delay 142, on the other hand, provides a 0.5 second delay wherein current remains on the gate 140 of triac 136 while triac 134 receives no gating current. Under this condition, where the field windings are powered while the shading windings are not, the field windings serve as motor brakes. Accordingly, the circuit of FIG. 10 illustrates not only the powering of the respective parallel connected index motors, but also the braking of the sampe parallel connected motors to rapidly stop the conveyor upon command from the motor run control 132.

Above, specific examples of the present invention have been described. It should be appreciated, however, that this description is given for purposes of illustration only, and is in no way intended to limit the scope of the present invention. Rather, it is the intention that the present invention be limited only as defined in the appended claims.

What is claimed is:

1. An automatic sample changer for transporting a plurality of test samples along a track, and for sequentially studying the characteristics of the samples being tested, the sample changer comprising: a base housing; a modular track housing mounted on said base housing; a testing region located in said base housing for studying the characteristics of the samples being tested; conveyor means in said base housing for sequentially associating the samples with the testing region; a continuous elongated track in said track housing which directly encounters said conveyor means at one location along its length; a plurality of independent transport means sequentially positioned along substantially the entire length of said track, each of which is adapted to associate with a sample; indexing means in said track housing for associating with said plurality of transport means to advance the samples associated therewith along said continuous track, said indexing means comprising at least one rotatable hub having a plurality of extensions thereon, each of which contacts and moves a plurality of said transport means at spaced locations along said track; and motor means in said track housing for controlling the operation of said indexing means.

2. The sample changer recited in claim 1, wherein each rotatable hub is detachably coupled to a shaft of respective motor means.

3. The sample changer recited in claim 2, and further comprising biasing means for urging each rotatable hub in the direction of said track and in a plane parallel to said track.

4. The sample changer recited in claim 3, and further comprising bearing means between said track and each rotatable hub for minimizing frictional resistance therebetween.

5. The sample changer recited in claim 1, wherein said motor means comprises at least one reversible motor.

6. The sample changer recited in claim 1, wherein said indexing means comprises a plurality of rotatable hubs, and wherein each rotatable hub associates with a respective motor means.

7. The sample changer recited in claim 6, wherein each said motor means is a reversible motor.

8. The sample changer recited in claim 6, wherein all of said motor means are connected in parallel, and each is equipped with an electrical braking mechanism.

9. The sample changer recited in claim 1, and further comprising a mechanism for indicating when the quantity of paper on a paper roll becomes low, and including: a center shaft for receiving the paper roll; a frame for supporting said paper roll through the means of said shaft, said frame having at least one inclined surface on which said shaft rolls through gravity upon the level of paper decreasing; support means for contacting the face of said paper roll, and for limiting the movement of said shaft along said inclined surface in accordance with the level of paper, said support means having a first mode of support when the level of paper is acceptable, and a second mode of support when the level of paper is low; and means for indicating a low level of paper, controlled by said support means and dependent upon the mode of support of said support means.

10. The sample changer recited in claim 1, and further comprising an electronic display for maintaining information to be displaced through interruptions of power, and including: electronic counter means for receiving signals indicative of the information to be displayed, and for storing said information only when biased in a first state; electronic display means for receiving signals from said counter means, and for displaying the information stored in said counter means; first power means for biasing said counter means in said first state; second power means for biasing said counter means in said first state; and switch means for actuating said second power means only upon interruption of said first power means.

11. The sample changer recited in claim 1, and further comprising a circuit for operating and braking electrical motors having shading and field windings and operating when both said shading and field windings receive power, and including: first triac means for providing power to said shading windings when gated "on"; second triac means for providing power to said field windings when gated "on"; control means for simultaneously issuing gating signals for said first and said second triac means; and delay means in the circuit of said second triac means for maintaining a gating signal to said second triac means for a predetermined time after said control means has ceased issuing gating signals for said first and said second triac means.

12. The sample changer recited in claim 11, and further comprising polarity reversing means for selectively reversing the polarity of power between said shading and field windings.

13. An automatic sample changer for transporting a plurality of test samples along a track, and for sequentially studying the characteristics of the samples being tested, the sample changer comprising: a base; a modular track unit mounted on said base; a testing region in said base; a continuous elongated track in said track unit which directly encounters an entry to said testing region at one location along its length; a plurality of independent transport means sequentially positioned along substantially the entire length of said track, each of which is adapted to associate with a sample; and indexing means in said track unit for associating with said plurality of transport means to advance the samples associated therewith along said continuous track, said indexing means comprising at least one rotatable hub having a plurality of extensions thereon each of which contacts and moves a plurality of said transport means at spaced locations along said track; and motor means in said track unit for controlling the operation of said indexing means.

* * * * *